This invention relates to inflatable structures made from thermoplastic film and a method for producing such structures and, more particularly, to inflatable enclosures made from thermoplastic film structures and a method for the production thereof.

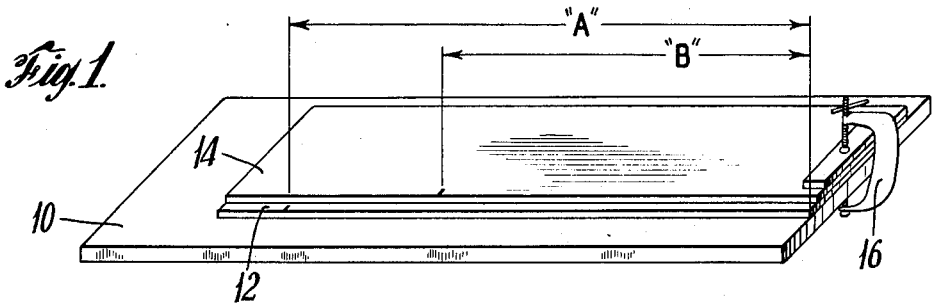
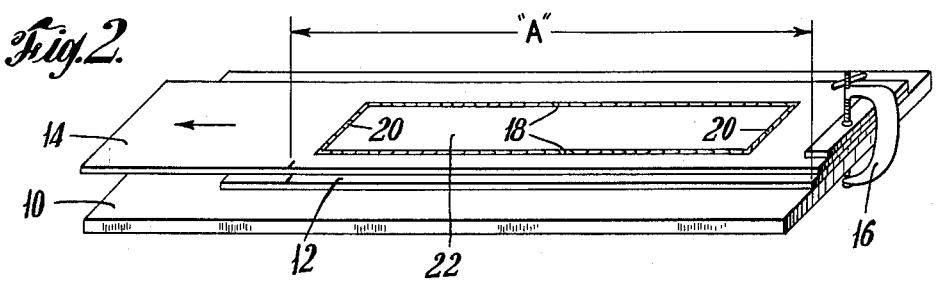
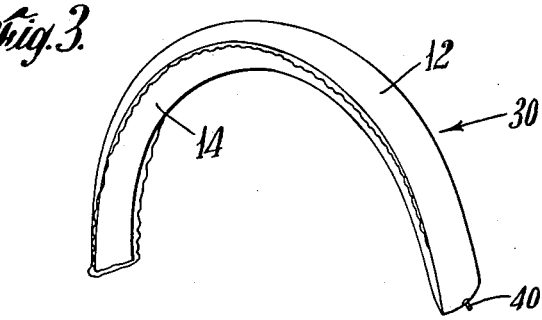
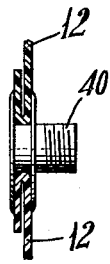
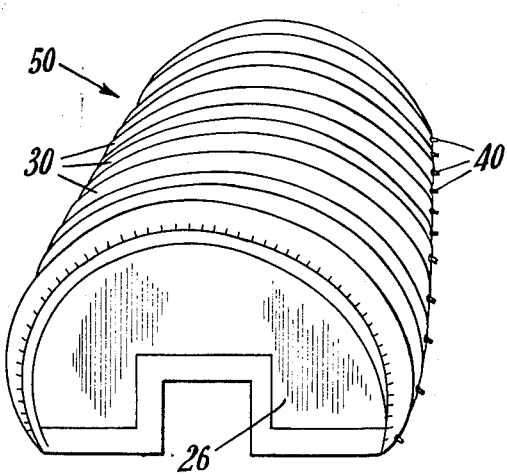
INVENTORS
WILLIAM A. SEUBERT
BRANDON B. PUSEY
BY *Walter C. Kehm*
ATTORNEY 3,059,656
INFLATABLE PLASTIC STRUCTURE
William A. Seubert, Trenton, and Brandon B. Pusey, Middlebush, N.J., assignors to Union Carbide Corporation, a corporation of New York
Filed Oct. 20, 1958, Ser. No. 768,277
1 Claim. (Cl. 135—1)

Inflatable structures, such as portable mattresses, are well known in the art. Difficulty has been found, however, in adapting known inflatable structures to use in enclosures, such as shelters and storage tanks. Advantages of inflatable structures over conventional bulky and rigid building members include greater convenience in transportation due to the comparatively small volume occupied by the uninflated structure and lightness of weight, greatly reduced times of assembly, and suitability in widely varying types of terrain.

Presently known inflatable structures are either supported by a positive pressure maintained within the structure and are thus prone to collapse or are fabricated from a number of inflatable members which are sealed together and inflated individually or collectively to provide the desired enclosure. Methods presently known for making these inflatable members include formation of an elongated, usually rectangular inflatable member which is inflated and thereafter bent into the desired shape and fastened there under continued stress; and formation of a helically sealed arc-shaped inflatable member which is fastened to similar members and inflated. The former method does not provide enclosures of adequate strength because the unnatural and continued stress on the corners of the bent elongated members causes misshaped enclosures which tend to buckle and are easily altered in contour by a compressive force. The latter method is able to produce members which are arc-shaped when inflated, and hence possess satisfactory compressive strength and are truly self-supporting. However, the seal between adjacent edges of the sheet making up the inflatable member forms a helical seam around the member. The seal is thus inordinately long in comparison with the arc length. This increases the chances of a failure of the seam and consequent collapse of the member. In addition, this method requires a mandrel around which the sheet is wrapped prior to sealing. Each variation in size and shape of the inflatable member necessitates a different mandrel and the method is therefore quite expensive. Also, a further step is needed to fabricate an enclosure from inflatable members made by this method since each member is formed individually and must be fastened to adjacent members in a separate operation.

Forming inflatable members from rubber and similar elastomeric compounds such as rubberized canvas has not been satisfactory because sheets of these materials are difficult to seal adequately. Seams between sheet edges and bonds between adjacent tubes in multi-tube structures, such as enclosures, split and the structure collapses. Thermoplastic films which are easily and conveniently sealed to one another can, however, provide joints or seams of adequate strength.

It is an object, therefore, of the present invention to provide curvilinear inflatable members and a method for the production thereof.

It is another object of our invention to provide a rapid and simple method for forming curvilinear inflatable members.

It is another object of the present invention to provide inflatable enclosures fabricated from curvilinear inflatable members.

These and other objects of our invention are achieved by sealing together two layers of stretchable thermoplastic film, one of which has been stretched, to define a rectangular enclosed space. And thereafter introducing gaseous fluid into the enclosed space to form an inflated member.

"Stretchable thermoplastic film" as used herein and in the claims refers to a flexible film which can be extended beyond its unstressed dimensions by application of a pulling force and which has a recoverable strain of from 5 to 25 percent. Among the many thermoplastic materials which have recoverable strains within this range are plasticized vinyl polymers, particularly polyvinylchloride and vinyl containing copolymers particularly plasticized vinyl chloride and vinyl acetate copolymers.

The means employed to seal the layers of thermoplastic film is not critical in our invention and can be accomplished in any manner which provides sufficient bond strength to prevent mechanical failure under continued loads. We prefer, particularly when sealing the above-mentioned plasticized polymers and copolymers, to employ an electronic heat sealer. Solvent sealers are also suitable as are thermoplastic adhesives which provide a seal capable of withstanding long-term stress.

A critical feature in obtaining the arc-shaped contours of the present invention is the difference in the degree of stretch induced in the sealed-together layers. Without a difference in the degree of stretch and consequent different expansion characteristics, the unwrinkled arc-shaped inflatable members of the present invention could not be obtained. The degree of stretch needed to provide a tube of the desired arc radius and tube diameter is calculated from the following relation $$e = \frac{r_i + D}{r_i} - 1$$

wherein $e$ is the strain expressed in inches per inch which must be induced in the stretched sheet of film; $r_1$ is the inside radius of the arc, in inches; and D is the tube diameter in inches. Some typical values for the calculation are given below in Table I.

*Table I*

| Desired inside radius of curvature, in. | Desired tube diameter, in. | Strain induced in stretched sheet, in./in. |
|---|---|---|
| 12 | 4 | 0.333 |
| 48 | 4 | 0.083 |
| 12 | 1 | 0.083 |
| 48 | 1 | 0.021 |

Arc shaped tubes are easily fabricated in accordance with the method of our invention by placing a layer of stretchable plastic over another layer of plastic and stretching the upper layer to the desired degree in accordance with the above equation. Two long parallel seals are made in the direction of stretch and two shorter parallel seals are made transverse to the first two and at either end thereof. When gaseous fluid is introduced into the space enclosed by the sheets and the parallel sets of seals an arc-shaped member is formed. The member is quite rigid and is completely self-supporting.

By making a series of long parallel seals, a bank of connected but not necessarily intercommunicating curvilinear tubular members can be produced. Variation in (1) the diameters of the tubes, (2) radii of curvature, and (3) arc lengths can be effected by (1) varying the distance between parallel seals, (2) by altering the tube diameter and degree of stretch of the stretched sheet, and (3) changing the length of the seal. An axially elongated arc-shaped tube can be produced by forming a long seal in the direction parallel to the direction of stretch and a short seal in the direction transverse to the direction of stretch. Other modifications of the invention are possible through variations in the thickness, strength, elastic modulus and other properties of the plastic films to meet special conditions of external loading and the like. In general, the tube diameter, tube wall thickness and tube wall modulus of elasticity determine the stiffness in bending of a fully inflated tube. The internal pressure which can be applied in the inflatable members of our invention is limited only by the tensile strength of the film sheet and the strength of the seal between the sheets. If a varying radius of curvature is desired along the length of a tube, the amount of stretch can be varied accordingly along the film sheet length or a stretched film of varying thickness can be employed.

In the drawings:

FIGURE 1 is an isometric view of an embodiment of the invention;

FIGURE 2 is an isometric view of the embodiment shown in FIGURE 1 wherein the upper sheet layer has been stretched;

FIGURE 3 is a pictorial view of an arc shaped tube produced by the method of the present invention;

FIGURE 4 is a sectional view of the valve shown in FIGURE 3;

FIGURE 5 is a pictorial view of a preferred embodiment of the present invention.

Referring now to the drawings in detail, FIGURE 1 shows the bed 10 of an electronic heat sealer supporting lower sheet 12 of thermoplastic film and superpositioned thereon upper sheet 14 of stretchable thermoplastic film. One end of upper sheet 12 and one of lower sheet 14 is pressed firmly against the sealer bed 10 by C clamp 16. Two distances are measured off on the sheets; a distance A is measured off on the lower sheet 12 and a mark made; a distance B is measured off on the upper sheet 14 and a mark made. The end of upper sheet 14 opposite the fixed end is then pulled away on a plane parallel to the plane of the sealer bed 10 to stretch the upper sheet 14 until the mark thereon coincides as shown in FIGURE 2, or a distance of (A—B). Two parallel electronic seals 18 are made along the long dimension of the film sheets 12 and 14. Two more parallel electronic seals 20 are made perpendicular to the seals 18 to form a substantially rectangular area 22 defined by two sets of parallel seals 18 and 20.

The film sheets 12 and 14 are trimmed so that only a small portion thereof remains on the periphery of the rectangle 22 defined by seals 18 and 20. A valve 40, shown in detail in FIGURE 4, is inserted in one of the film sheets and gaseous fluid is introduced between the adjacent sealed-together film sheets 12 and 14 into the space they enclose defined by the seals 18 and 20. The introduction of the gaseous fluid, preferably air, causes the film sheets 12 and 14 to be distended. The stretched upper sheet 14, after sealing and release of tension, returns to its original length. Upon inflation, the structure will curve until the stresses on the two sheets are approximately equal, resulting in an arc-shaped form 30 such as shown in FIGURE 3.

A model of a specific embodiment of our invention is shown in FIGURE 5. Therein a series of arc-shaped tubes 30, joined but not intercommunicating, and provided with valves 40 for individual inflation, form a multi-tube structure 50. At either end of the series of tubes 30 are end panels 26 made of a suitable material such as film sheet which substantially cover the end portions of the multi-tube structure 50. The end panels 26 are provided with comparatively small openings which, in a larger structure, serve as entrance-ways.

The following examples are illustrative of our invention:

EXAMPLE I

Two sheets of a vinyl film formed from 63.5% by weight of (vinyl chloride-vinyl acetate) copolymer containing 96% vinyl chloride residues and plasticized with 35% by weight of di(2-ethylhexyl)phthalate having a thickness of 0.0205 inch and a tensile modulus of elasticity of 718 p.s.i. were used. One sheet was laid flat on the bed of sealing press (Thermatron Sealing Press, marketed by Radio Receptor Company Inc.). A second sheet was laid over the first and one end of each was clamped to the heat sealer bed. A mark was made on each sheet. The distance from the clamp to the mark on the lower sheet was 15% greater than the distance from the clamp to the mark on the upper sheet.

The upper sheet was stretched until the mark in the lower sheet and the upper one coincided. This necessitated a 15% stretch in the upper sheet. A bar sealer, 54 inches long and 1/8 inch wide was used to seal the stretched upper sheet and the lower sheet together along two parallel lines about four inches apart. The sealer used employed a Thermatron industrial R. F. Generator, type K40S, at 18 mc. nominal frequency. The current level time was 3/4 second.

Two 54 inch seals having been made, two four inch seals were then formed therebetween at either extremity of the long seals to form a closed rectangle of seals 4 inches by 54 inches. After the excess film around the perimeter of the seals had been trimmed away, a valve was inserted in what had been the lower sheet. Upon inflation, the tube formed an arc of approximately 180°. The tube diameter was 2½ inches and the length of the arc was about 54 inches.

The tube was inflated at internal pressures of 0.5, 1.0 and 1.5 p.s.i. Both tube diameter and arc length increased with an increase in internal pressure. The radius of curvature increased only $1/16$ of an inch, $20\ 3/16$ inches to $20\ 1/4$ inches, when the pressure was increased from 0.5 to 1.5 p.s.i. pressure.

EXAMPLE II

A second tube was made as in Example I except that the distance between the long parallel seals was 4¾ inches. Upon inflation, the tube diameter was found to be 3 inches, the arc approximately 190–200° and the arc length again about 54 inches. The radius of curvature was measured at internal pressures of 0.5, 1.0 and 1.5 p.s.i. At the lowest pressure the radius was $8\ 13/16$ inches; at the middle pressure the radius was $9\ 5/16$ inches. The radius of curvature, therefore, comparing Examples I and II, increases with increasing internal pressure at higher tube diameter-to-arc radius of curvature ratios.

EXAMPLE III

Three banks of four tubes each were fabricated in the manner described above, except that additional heat seals were made to give the four individual tubes. Three banks of tubes were made in this manner and each of the tubes were individually inflated. The banks of tubes were fastened together to form an axially elongated arc shaped structure. The tube diameters were approximately 3.5 inches on the average and provided a structure about 40 inches long and 13 inches in height.

The above-described inflatable thermoplastic structures and the method for their manufacture are easily adapted to a great many uses. Among these may be mentioned portable, inflatable buildings and shelters, made either from these tubes alone or tubes encased in lightweight sleeves; beach equipment, piping, ductwork molds and containers.

What is claimed is:

An axially extended arc-shaped structure useful as an enclosure comprising a bank of inflated curvilinear tubular members connected by long parallel seals, said tubular members comprising two peripherally fluid tightly sealed together sheets of vinyl chloride-vinyl acetate copolymer film, one sheet being stretched from 5 to 25% beyond its unstressed dimensions and the other sheet being substantially unstretched.

References Cited in the file of this patent

UNITED STATES PATENTS

| | | |
|---|---|---|
| 2,046,039 | Schaar | June 30, 1936 |
| 2,259,347 | Mallory | Oct. 14, 1941 |
| 2,575,764 | Morner | Nov. 20, 1951 |
| 2,672,628 | Spanel | Mar. 23, 1954 |
| 2,740,742 | Vaughan | Apr. 3, 1956 |
| 2,743,510 | Mauney et al. | May 1, 1956 |
| 2,826,523 | Blaszkowski et al. | Mar. 11, 1958 |
| 2,900,994 | Igoe | Aug. 25, 1959 |